United States Patent
Liu et al.

(10) Patent No.: US 12,472,627 B2
(45) Date of Patent: Nov. 18, 2025

(54) SYSTEM AND METHOD FOR MULTI-ROBOT FLEET CONTROL IN HEALTHCARE ENVIRONMENT

(71) Applicants: Futronics (NA) Corporation, Pasadena, CA (US); UBTECH ROBOTICS CORP LTD, Shenzhen (CN)

(72) Inventors: Zhipeng Liu, Pasadena, CA (US); Huaguang Du, Pasadena, CA (US); Fangyun Zhao, Pasadena, CA (US); Chengkun Zhang, Pasadena, CA (US); Huan Tan, Pasadena, CA (US)

(73) Assignees: FUTRONICS (NA) CORPORATION, Pasadena, CA (US); UBTECH ROBOTICS CORP LTD, Shenzhen (CN)

(*) Notice: Subject to any disclaimer, the term of this patent is extended or adjusted under 35 U.S.C. 154(b) by 90 days.

(21) Appl. No.: 18/431,482

(22) Filed: Feb. 2, 2024

(65) Prior Publication Data
US 2025/0249582 A1    Aug. 7, 2025

(51) Int. Cl.
*B25J 9/16* (2006.01)
*B25J 11/00* (2006.01)

(52) U.S. Cl.
CPC .......... *B25J 9/1664* (2013.01); *B25J 9/1653* (2013.01); *B25J 11/008* (2013.01)

(58) Field of Classification Search
CPC ....... B25J 9/1664; B25J 9/1653; B25J 11/008
See application file for complete search history.

(56) References Cited

U.S. PATENT DOCUMENTS

| | | | | |
|---|---|---|---|---|
| 2007/0129849 A1* | 6/2007 | Zini | ..................... | G05D 1/0225 |
| | | | | 700/258 |
| 2011/0238292 A1* | 9/2011 | Bresnahan | ......... | G01C 21/3407 |
| | | | | 701/533 |
| 2018/0299882 A1* | 10/2018 | Kichkaylo | ....... | G05B 19/41895 |
| 2018/0319594 A1* | 11/2018 | Blevins | ..................... | B66F 9/18 |

(Continued)

OTHER PUBLICATIONS

Ortiz et al., Fleet Management System for Mobile Robots in Healthcare Environments, Journal of Industrial Engineering and Management, (JIEM) ISSN 2013-0953, OmniaScience, Barcelona, vol. 14, Iss. 1, pp. 55-71.

(Continued)

*Primary Examiner* — Sohana Tanju Khayer
(74) *Attorney, Agent, or Firm* — Bayes PLLC

(57) ABSTRACT

According to one aspect of the present disclosure, a method of multi-robot fleet control by a network device is provided. The method may include estimating a path to a final target for a robot. The method may include determining whether the robot will traverse a crossing region based on the path to the final target. The method may include, in response to determining that the robot will traverse the crossing region, updating a stop list for the robot to include a stop point for the crossing region. The method may include causing the robot to move to and stop at the stop point for the crossing region until any other robot in the multi-robot fleet arriving at the crossing region prior to the robot has cleared the crossing region. The method may include causing the robot to move to and stop at the emergency stop line during an emergency-operation mode.

20 Claims, 9 Drawing Sheets

(56) References Cited

U.S. PATENT DOCUMENTS

| | | | | |
|---|---|---|---|---|
| 2020/0027371 | A1* | 1/2020 | Tsuchiya | A63F 9/24 |
| 2020/0089237 | A1* | 3/2020 | Whitaker | G05D 1/0234 |
| 2020/0334637 | A1* | 10/2020 | Turner | G06Q 10/08355 |
| 2021/0114218 | A1* | 4/2021 | Kim | B25J 9/1651 |
| 2021/0229658 | A1* | 7/2021 | Tsuji | B60W 60/0016 |
| 2021/0356279 | A1* | 11/2021 | Szigeti | G01C 21/3407 |
| 2022/0063108 | A1* | 3/2022 | Viilup | B25J 11/008 |
| 2022/0083062 | A1* | 3/2022 | Jaquez | B65G 1/1378 |
| 2023/0042431 | A1* | 2/2023 | Ramamoorthy | G06F 17/18 |
| 2023/0244235 | A1* | 8/2023 | Okada | G05D 1/0274 |
| | | | | 701/26 |
| 2023/0266763 | A1* | 8/2023 | Liu | G05D 1/0214 |
| | | | | 701/26 |
| 2023/0278232 | A1* | 9/2023 | Mohanarajah | B65G 1/10 |
| | | | | 700/248 |
| 2024/0004391 | A1* | 1/2024 | Galluzzo | G05D 1/6987 |
| 2024/0361137 | A1* | 10/2024 | Aviv | B60L 58/12 |
| 2025/0115279 | A1* | 4/2025 | Stein | B60W 60/0015 |

OTHER PUBLICATIONS

Tambutti et al., State of the Art in Control Systems for Cooperative Distributed Mobile Robots in a Healthcare Environment, Bioingenieria, https://doi.org/10.17979/spudc.9788497498418.0050. (2022) pp. 50-57.

Valner et al., Scalable and Heterogenous Mobile Robot Fleet-Based Task Automation in Crowded Hospital Environments—A Field Test, Frontiers in Robotics and AI, (Aug. 2022) pp. 1-12.

* cited by examiner

SYSTEM AND METHOD FOR MULTI-ROBOT FLEET CONTROL IN HEALTHCARE ENVIRONMENT

TECHNICAL FIELD

The present disclosure relates to systems and methods for controlling a multi-robot fleet in a healthcare environment.

BACKGROUND

Mobile robots can improve delivery efficiency within a healthcare environment (e.g., a hospital), thereby increasing the productivity of the medical staff. However, when implementing a fleet of mobile robots in healthcare environment, several challenges arise.

First, healthcare environments operate under stringent safety protocols and functions. Existing fleet-control systems designed for logistic systems or outdoor environments are unable to meet the safety requirements of healthcare environments. For example, fleet-traffic rules implemented by warehouse-logistic systems are not designed with protocols and route planning in the event of a medical emergency. This is problematic for applications in hospitals, especially for emergency or operating rooms. Second, there are no established standards that provide rules for a secure and safe robot-fleet management system. Standards for existing fleet-management systems are related to the architecture of the whole system, e.g., the operating system, the task scheduler, the robot controller, etc. Third, existing robotic-control systems focus on navigation, obstacle detection, and path-planning capabilities for a single robot. These systems do not consider the integration of multiple types of robots in an indoor healthcare environment.

Thus, there exists an unmet need for a system that controls a multi-robot fleet within a healthcare environment, and that implements established protocols in the event of a medical emergency.

SUMMARY

According to one aspect of the present disclosure, a method for controlling a multi-robot fleet comprising a plurality of robots performed by a network device in a healthcare environment is provided. For each robot of the plurality of robots during a normal-operation mode of the multi-robot fleet, the method may include estimating, by a processor, a path to a final target for a robot. For each robot of the plurality of robots during a normal-operation mode of the multi-robot fleet, the method may include determining, by the processor, whether the robot will traverse a crossing region based on the estimated path to the final target. For each robot of the plurality of robots during a normal-operation mode of the multi-robot fleet, the method may include, in response to determining that the robot will traverse the crossing region, updating, by the processor, a stop list for the robot to include a stop point for the crossing region. For each robot of the plurality of robots during a normal-operation mode of the multi-robot fleet, the method may include causing, by the processor, the robot to move to and stop at the stop point for the crossing region until any other robot in the multi-robot fleet arriving at the crossing region prior to the robot has cleared the crossing region.

According to another aspect of the present disclosure, an apparatus for controlling a multi-robot fleet comprising a plurality of robots is provided. The apparatus may include a processor and memory storing instructions. The memory storing instructions, which when executed by the processor, cause the processor to, for each robot of the plurality of robots during a normal-operation mode of the multi-robot fleet, estimate a path to a final target for a robot. The memory storing instructions, which when executed by the processor, cause the processor to, for each robot of the plurality of robots during a normal-operation mode of the multi-robot fleet, determine whether the robot will traverse a crossing region based on the estimated path to the final target. The memory storing instructions, which when executed by the processor, cause the processor to, for each robot of the plurality of robots during a normal-operation mode of the multi-robot fleet, and in response to determining that the robot will traverse the crossing region, update a stop list for the robot to include a stop point for the crossing region. The memory storing instructions, which when executed by the processor, cause the processor to, for each robot of the plurality of robots during a normal-operation mode of the multi-robot fleet, cause the robot to move to and stop at the stop point for the crossing region until any other robot in the multi-robot fleet arriving at the crossing region prior to the robot has cleared the crossing region.

According to a further aspect of the present disclosure, a non-transitory computer-readable medium storing instructions for controlling a multi-robot fleet including a plurality of robots, the instructions. The instructions, which when executed by at least on processor, cause the at least one processor to, for each robot of the plurality of robots during a normal-operation mode of the multi-robot fleet, estimate a path to a final target for a robot. The instructions, which when executed by at least on processor, cause the at least one processor to, for each robot of the plurality of robots during a normal-operation mode of the multi-robot fleet, determine whether the robot will traverse a crossing region based on the estimated path to the final target. The instructions, which when executed by at least on processor, cause the at least one processor to, for each robot of the plurality of robots during a normal-operation mode of the multi-robot fleet, in response to determining that the robot will traverse the crossing region, update a stop list for the robot to include a stop point for the crossing region. The instructions, which when executed by at least on processor, cause the at least one processor to, for each robot of the plurality of robots during a normal-operation mode of the multi-robot fleet, cause the robot to move to and stop at the stop point for the crossing region until any other robot in the multi-robot fleet arriving at the crossing region prior to the robot has cleared the crossing region.

It is to be understood that both the foregoing general description and the following detailed description are exemplary and explanatory only and are not restrictive of the invention, as claimed.

DETAILED DESCRIPTION

Figure 1:
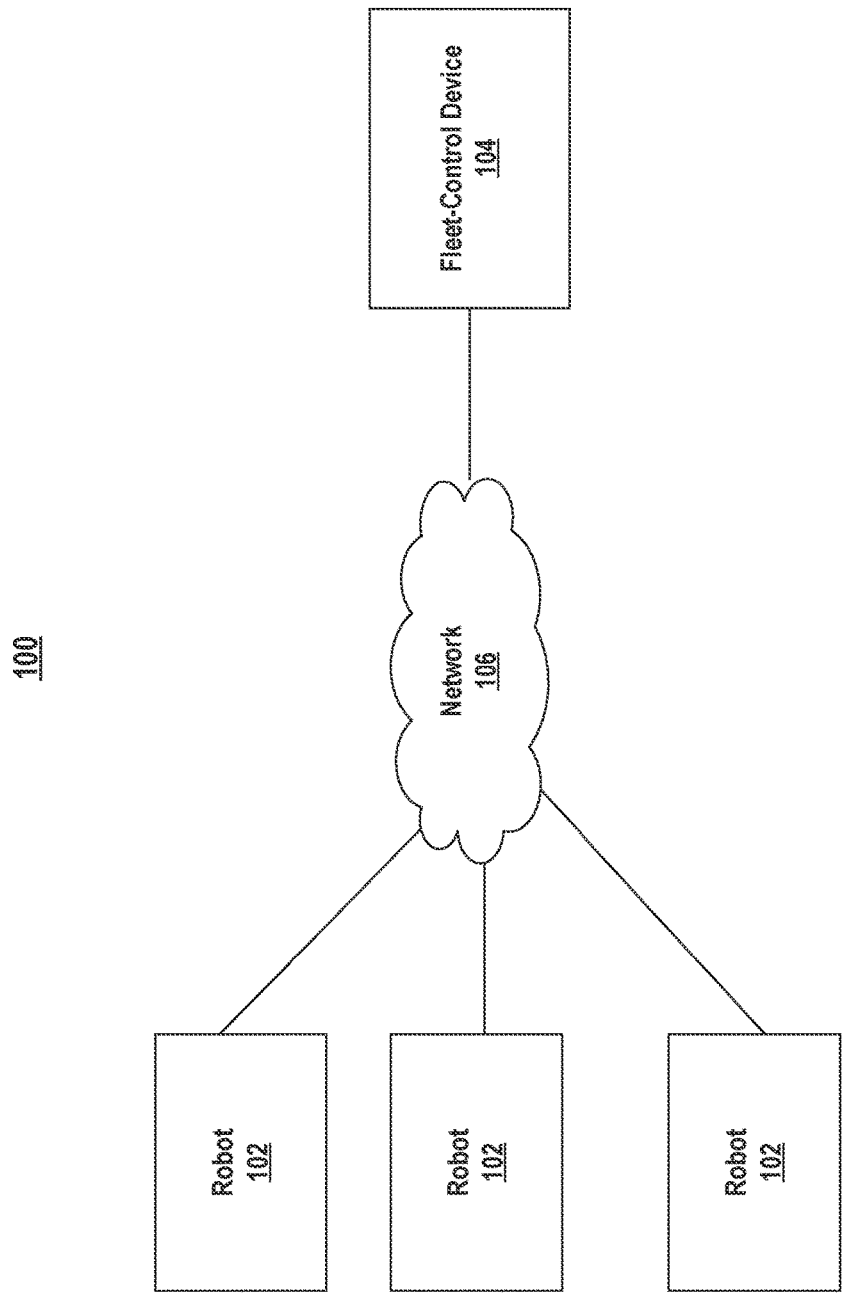
FIG. 1 illustrates an exemplary multi-robot fleet system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

The disclosed systems and methods control a multi-robot fleet during a normal-operation mode and an emergency-operation mode. The proposed system may apply to a robot fleet where each robot has an independent navigation system. In general, a robot's navigation system may include a global static map, a local dynamic map, a path-planning function, and a path-tracking function. When instructed to move to a target position by a fleet-control device, the robot will identify a collision-free path from its current position to the target position. Then, the robot may follow the path to the target position while avoiding all obstacles. When the planned path is blocked by one or more unexpected obstacles (e.g., walking patients, medical beds, or other robots on the way) detected on local dynamic map, the robot will re-plan a new path to avoid them. The proposed fleet-control system coordinates mobile robots in medical facilities to minimize congestion and obey the facility's rules in case of an emergency.

To that end, the present disclosure provides an exemplary fleet-control device (e.g., network device, a cloud server, etc.) that may identify areas-of-interest within the facility to control the operations of the robot fleet during a normal-operation mode and an emergency-operation mode. The areas-of-interest may be identified based on a global static map of the facility (e.g., medical facility, hospital, doctor's office, rehabilitation center, etc.).

For instance, the area-of-interest for the normal-operation mode may include crossing regions. A crossing region may be an area that has one or multiple entry sources/directions, and in which congestion is likely to occur if multiple robots enter the area concurrently. By way of example and not limitation, a crossing region may include a small patient room, a narrow corridor, hallway intersections, etc. The fleet-control device may assign detection lines and stopping points outside the crossing regions. The detection lines may be used to determine whether a robot will traverse a crossing region while navigating to a target position. The stopping points may be used to stop the robot before it enters the crossing region to ensure the path is clear prior to entry. In this way, congestion within a crossing region caused by multiple robots may be avoided during normal-operation mode.

On the other hand, the area-of-interest for the emergency-operation mode may include emergency areas. In a hospital, an emergency area typically includes ambulance entrance, resuscitation rooms and their pathways, as well as the regions in which an emergency "blue code" may occur. The fleet-control device may assign emergency stop lines within the emergency area(s). During the emergency-operation mode, the fleet-control device may cause each of the robots to move to its nearest emergency stop line. The emergency stop lines may be identified such that they are out of the main pathway and are used for robots to stop in an emergency situation. By positioning the robots on the emergency stop lines during an emergency, a clear pathway of any emergency equipment and/or staff can be ensured.

Additional details of the exemplary fleet-control device and its operations are provided below in connection with FIGS. 1-5D.

FIG. 1 illustrates an exemplary robot-fleet system 100 (referred to as "system 100" hereafter), according to embodiments of the disclosure. As shown in FIG. 1, system 100 may include a plurality of robots 102, a fleet-control device 104, and a network 106. Robot 102 may include a machine capable of moving from one position to another within a facility to deliver or remove items under the control of fleet-control device 104. The fleet of robots may include robots of various types, in some implementations. Each robot 102 may have an independent navigation system. In general, the navigation system of robot 102 may include of a global static map, a local dynamic map, a path-planning function, and a path-tracking function. When given a target position by fleet-control device 104, robot 102 will search a collision-free path from its current position to the target position, and follow the path while avoiding all obstacles. When the planned path is blocked by any unexpected obstacles detected on local dynamic map, for example, walking patients, medical beds or other robots on the way, robot 102 will re-plan a new path to avoid them. Fleet-control device 104 coordinates the navigation of the plurality of robots 102 in the facility to minimize congestion and obey the facility's rules during an emergency.

Fleet-control device 104 may maintain a navigation-task list of each robot 102 and communicate with each robot 102 in real time. This communication may include monitoring the position of each robot, listening to each robot's working status (busy or idle), and assign a navigation task to any robot 102 (e.g., causing robot 102 to move to a target position). The fleet-control device 104 may communicate with the plurality of robots 102 via network 106.

In some embodiments, system 100 may optionally include a network 106 to facilitate the communication among the various components of system 100, such as fleet-control device 104 and the fleet of robots. For example, network 106 may be a local area network (LAN), a wireless network, a cloud computing environment (e.g., software as a service, platform as a service, infrastructure as a service), a client-server, a wide area network (WAN), etc. In some embodiments, network 106 may be replaced by wired data communication systems or devices. Network 106 may provide speed and bandwidth sufficient for transmitting data between the abovementioned components so that the time lag is minimized and real-time processing of fleet-control data is not affected.

In some embodiments, fleet-control device 104 may implement protocols that mitigate traffic congestions in hospitals and healthcare environments. In some embodiments, fleet-control device 104 may implement rules that manage robot behaviors at crossing regions in hospitals and healthcare environments (as described below in connection with FIGS. 2, 3A, and 3B). In some embodiments, fleet-control device 104 may implement rules that execute traffic rules based on emergency situations (as described below in connection with FIGS. 2 and 4). Additional details of the fleet-control device 104 are provided below in connection with FIG. 2.

Figure 2:
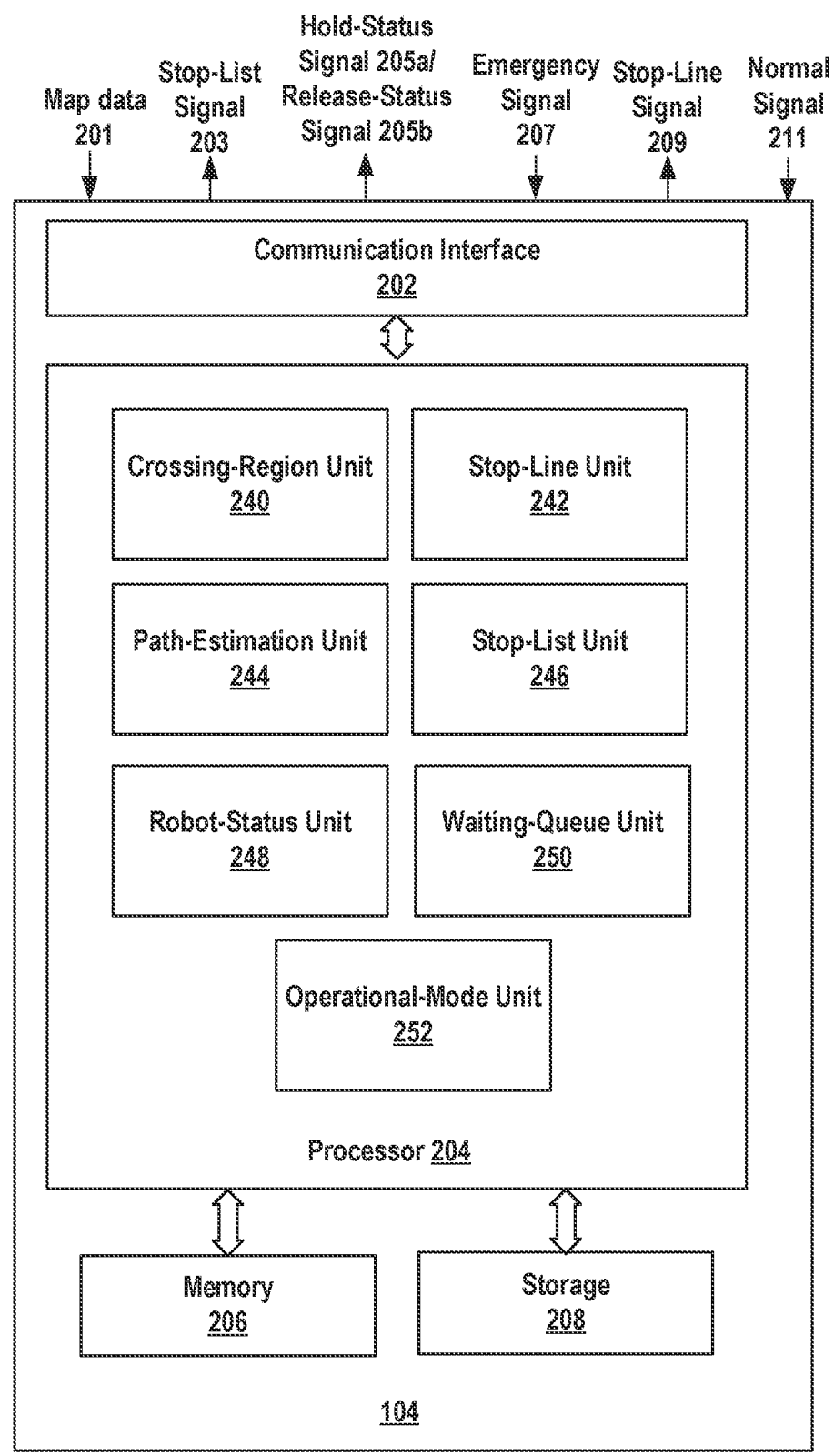
FIG. 2 illustrates a block diagram of an exemplary fleet-control device illustrated in FIG. 1, according to embodiments of the disclosure.
Figure 3A:
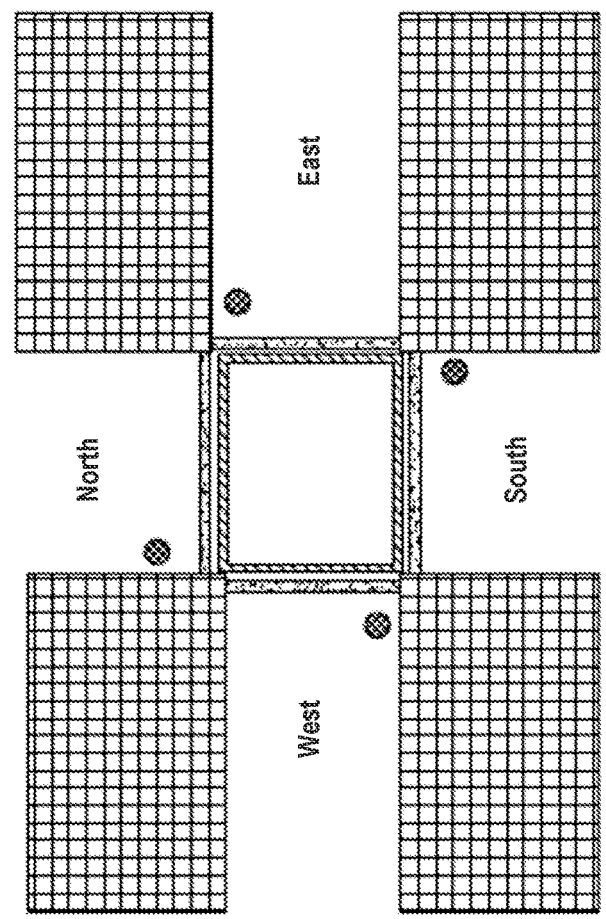
FIG. 3A illustrates a schematic diagram of first exemplary detection lines and stopping points used during normal-operation mode by the fleet-control device of FIG. 2, according to embodiments of the disclosure.
Figure 3B:
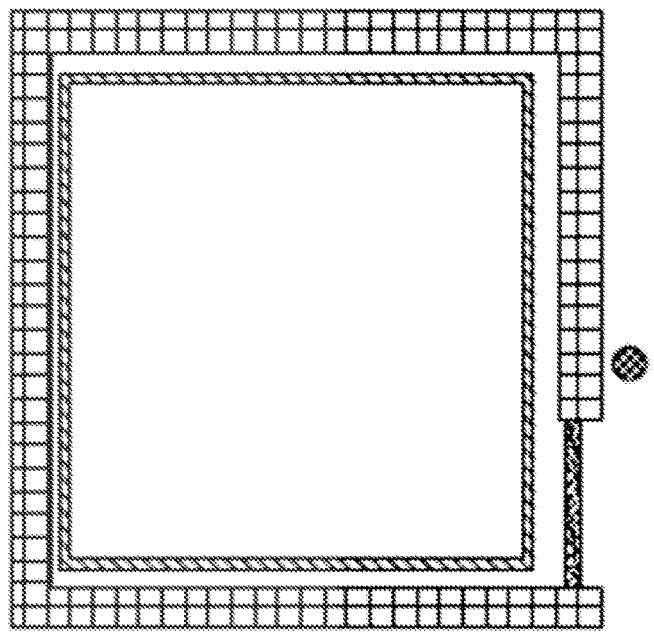
FIG. 3B illustrates a schematic diagram of second exemplary detection lines and stopping points used during normal-operation mode by the fleet-control device of FIG. 2, according to embodiments of the disclosure.
Figure 3B:
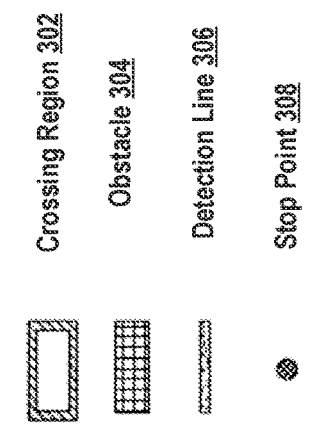
Figure 4:
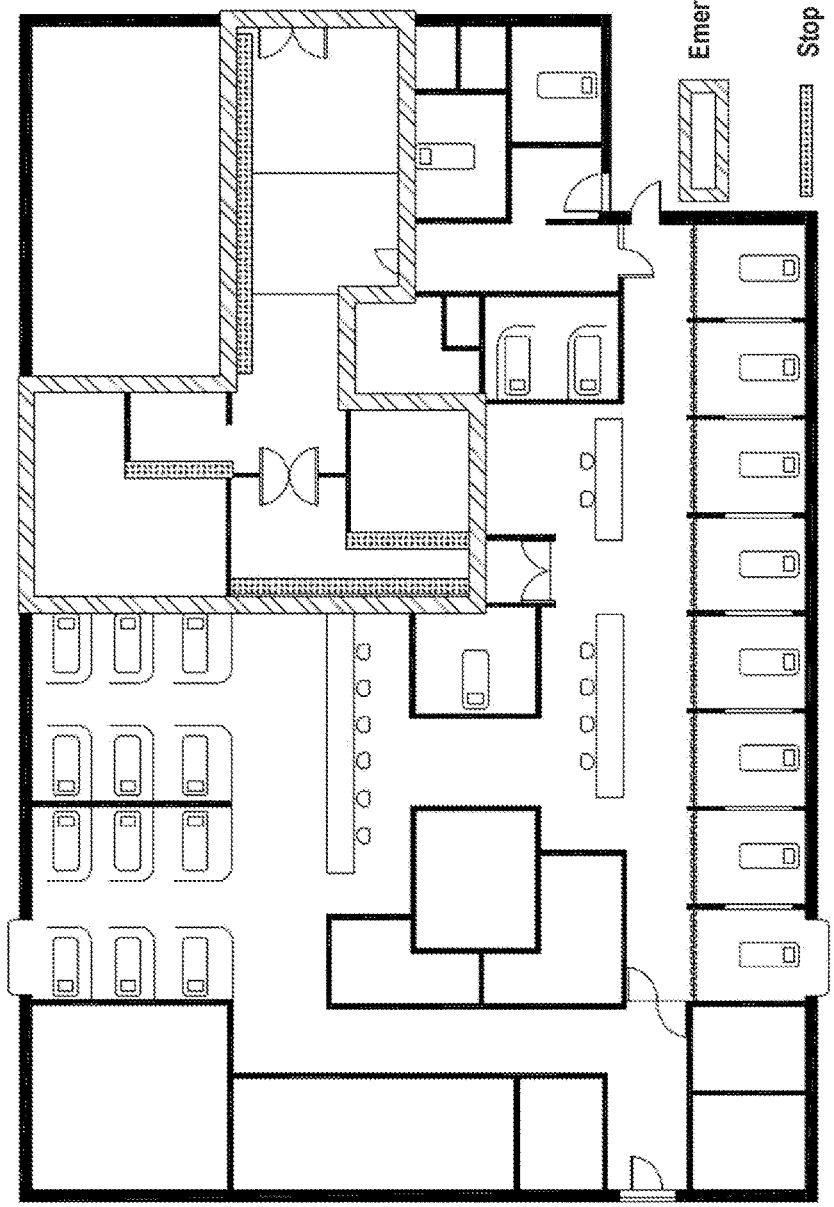
FIG. 4 illustrates a schematic diagram of exemplary emergency stop lines used during an emergency-operation mode by the fleet-control device of FIG. 2, according to embodiments of the disclosure.

FIG. 2 illustrates a block diagram of an exemplary fleet-control device 104, according to embodiments of the disclosure. FIG. 3A illustrates a schematic diagram 300 of first exemplary detection lines and stopping points implemented during normal-operation mode by the fleet-control device of FIG. 2, according to embodiments of the disclosure. FIG. 3B illustrates a schematic diagram 325 of second exemplary detection lines and stopping points implemented during normal-operation mode by the fleet-control device of FIG. 2, according to embodiments of the disclosure. FIG. 4 illustrates a schematic diagram 400 of exemplary emergency stop lines implemented during an emergency-operation mode by the fleet-control device of FIG. 2, according to embodiments of the disclosure. FIGS. 2, 3A, 3B, and 4 will be described together.

In some embodiments, as shown in FIG. 2, fleet-control device 104 may include a communication interface 202, a processor 204, a memory 206, and a storage 208. In some embodiments, fleet-control device 104 may include different modules in a single device, such as an integrated circuit (IC) chip (implemented as an application-specific integrated circuit (ASIC) or a field-programmable gate array (FPGA)), or separate devices with dedicated functions. In some embodiments, one or more components of fleet-control device 104 may be located in a cloud, or alternatively in a single location (such as a hospital server room) or distributed locations. Components of fleet-control device 104 may be in an integrated device, or distributed at different locations but communicate with each other through a network (not shown).

Communication interface 202 may receive data from each robot 102 in the fleet via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network.

Consistent with some embodiments, communication interface 202 may receive a map data 201 (e.g., global static map data and/or a local dynamic map data). Memory 206 and/or storage 208 may maintain the global static map data and/or local dynamic map data included in map data 201. Global static map data may include a floor plan of the facility in which the robot fleet operates. Local dynamic map data may include the location of medical equipment in relation to the floor plan, personnel in relation to the floor plan, the location of each robot 102 in the fleet in relation to the floor plan, etc. Local dynamic map data may be updated/received at predetermined intervals, e.g., such as every millisecond, every second, every minute, etc.

Processor 204 may be a processing device that includes one or more general processing devices, such as a microprocessor, a central processing unit (CPU), a graphics processing unit (GPU), and the like. More specifically, processor 204 may be a complex instruction set computing (CISC) microprocessor, a reduced instruction set computing (RISC) microprocessor, a very long instruction word (VLIW) microprocessor, a processor running other instruction sets, or a processor that runs a combination of instruction sets. Processor 204 may also be one or more dedicated processing devices such as application specific integrated circuits (ASICs), field programmable gate arrays (FPGAs), digital signal processors (DSPs), system-on-chip (SoCs), and the like.

Processor 204 may be configured as a separate processor module dedicated to performing processing video signal 113 from video database 103 or camera 110. Alternatively, processor 204 may be configured as a shared processor module for performing other functions. Processor 204 may be communicatively coupled to memory 206 and/or storage 208 and configured to execute the computer-executable instructions stored thereon.

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (e.g., non-transitory) computer-readable medium including, but not limited to, a ROM, a flash memory, a dynamic RAM, and a static RAM. Memory 206 and/or storage 208 may store one or more computer programs that may be executed by processor 204 to perform fault determination disclosed herein. For example, memory 206 and/or storage 208 may store program(s) that may be executed by processor 204 to determine the type of the accident and the fault of the vehicles involved in the accident.

Memory 206 and/or storage 208 may further store information and data used by processor 204. For instance, memory 206 and/or storage 208 may store various types of data, such as map data 201. Memory 206 and/or storage 208 may also store intermediate data, such as the location and characteristics of a fleet of robots, the determined trajectory of each robot, etc. Memory 206 and/or storage 208 may update the local dynamic map based on newly received data related to the position and/or trajectory of medical equipment, personnel, and/or robots. The various types of data may be stored permanently, removed periodically, or disregarded immediately after each update to the local dynamic map data.

As shown in FIG. 2, processor 204 includes multiple modules, such as a crossing-region unit 240, a stop-line unit 242, a path-estimation unit 244, a stop-list unit 246, a robot-status unit 248, a waiting-queue unit 250, an operational-mode unit 252, etc. These modules (and any corresponding sub-modules or sub-units) can be hardware units (e.g., portions of an integrated circuit) of processor 204 designed for use with other components or software units implemented by processor 204 through executing at least part of a program. The program may be stored on a computer-readable medium, and when executed by processor 204, it may perform one or more functions. Although FIG. 2 shows units 240, 242, 244, 246, 248, 250, and 252 all within one processor 204, it is contemplated that these units may be distributed among multiple processors located near or remotely with each other. According to the present disclosure, the number and type of these modules are not limited to those shown in FIG. 2.

In some embodiments, units 240, 242, 244, 246, 248, 250, and 252 of FIG. 2 may execute computer instructions to control a robot fleet using a first set of operations associated with normal-operation mode and a second set of operations associated with emergency-operation mode. Most of time, operational-mode unit 252 configures fleet-control device 104 to perform operations in normal-operation mode. However, when an emergency signal 203 is received (e.g., such as in the event of a "blue code" situation in a hospital), operational-mode unit 252 may configure fleet-control device 104 to perform operations associated with an emergency-operation mode.

In some embodiments, referring to FIGS. 2, 3A, and 3B, crossing-region unit 240 may identify the one or more crossing regions 302 based on the global static map data. As mentioned above, a crossing region 302 may include an area with various obstacles 304 (e.g., walls, pillars, stairs, etc.) and one or more entry sources/directions. Crossing region 302 is an area in which congestion is likely to occur if multiple robots enter the area concurrently. By way of example and not limitation, crossing region 302 may include a small patient room (see FIG. 3B), a narrow corridor (not shown), hallway intersections (see FIG. 3A), etc. For each crossing region 302, crossing-region unit 240 may set a set of detection lines 306 associated with an entrance and an exit of the crossing region 302. The detection lines are used to detect if a robot will pass a specific crossing region. If a robot's planned path intersects with any detection line 306, then crossing-determination unit 246 can identify which crossing region 302 the robot will pass on its way to its target position and from which entrance. Moreover, crossing-region unit 240 may set a stop point 308 for the crossing region outside of each detection line 306. Stop point 308 is used as a location for robots to stop before entering crossing region 302.

In some embodiments, referring to FIGS. 2 and 4, stop-line unit 242 may identify at least one emergency area 402 based on the global static map data. By way of example and not limitation, assuming the facility is a hospital, emergency area 402 may include an ambulance entrance, resuscitation rooms and their pathways, as well as the regions that an emergency "blue code" may occur. For each emergency area of the at least one emergency area, stop-line unit 424 may set at least one emergency stop line 404. Stop line 404 is set such that it is out of the way of the main pathway and is used for robots to stop in an emergency situation. During an emergency situation, robots move to an remain on the closest stop line 404. In this way, robots do not interfere with emergency equipment or staff during a "code blue" situation.

Referring to FIGS. 2, 3A, and 3B, fleet-control device 104 may perform the following operations for each robot in the fleet and for each crossing region during a normal-operation mode. For example, path-estimation unit 244 may estimate a path to a final target (e.g., target position) for a robot based on a path-estimation function. The path-estimation function may be the same path-planning function that is part of a robot's navigation system, or alternatively a simpler path-searching function. The purpose of the path-estimation function is to identify which crossing regions a robot will traverse on its way to the final target. To that end, path-estimation unit 244 may estimate the path that each robot will plan towards its final target. Path-estimation unit 244 may not estimate the path exactly the same as the actual planned path of each robot, as long as it can correctly estimate if a robot will pass any crossing regions. For instance, path-estimation unit 244 may estimate the robot's path based solely on the global static map data, while the robot's path-planning function may identify the path based on the global static map data and the local dynamic map data. In some embodiments, the path-estimation unit 244 may determine whether the robot will traverse crossing region 302 based on the path to the final target.

In some embodiments, referring to FIGS. 2, 3A, and 3B, in response to the path-estimation unit 244 determining that the robot will traverse crossing region 302, stop-list unit 246 may update a stop list for the robot to include stop point 308 for crossing region 302. For instance, stop-list unit 246 may maintain a look-up table of stop points and corresponding crossing regions for each robot in the fleet. Stop-list unit 246 may receive a signal indicating a newly identified crossing region traversal for a robot from path-estimation unit 244. Upon receipt of the signal, stop-list unit 246 may update the stop list. Communication interface 202 may transmit a stop-list signal 203, which indicates the stop points along the robot's path to the final target. Stop-list signal 203 cause the robot to move to stop point 308 for the crossing region 302.

In some embodiments, referring to FIGS. 2, 3A, and 3B, robot-status unit 248 may determine when the robot arrives at stop point 308 based on map data 201 (e.g., local dynamic map data). In response to the robot arriving at stop point 308 for crossing region 302, robot-status unit 248 may set a status for the robot to "hold." Communication interface 202 may send a hold-status signal 205a that indicates the robot's hold status. In response to the hold-status signal 205a, the robot waits at stop point 308 until a release-status signal 205b is received. Once the hold status is set by robot-status unit 248, stop-list unit 246 may remove stop point 308 from the stop list for the robot. Moreover, in response to determining the robot arrives at the stop point, robot-status unit 248 may send a signal to waiting-queue unit 250. Waiting-queue unit 250 may update a waiting queue associated with stop point 308 to include an identification of the robot. The waiting queue may have a first-in-first-out data structure. Waiting-queue unit 250 may determine whether another robot is located within the crossing region based on map data 201 (e.g., local dynamic map data). In response to determining that the crossing region is clear (e.g., another robot is not within the crossing region), waiting-queue unit 250 may remove the identification associated with the robot from the waiting queue. When the identification is removed from the waiting queue, waiting-queue unit 250 may send a signal to robot-status unit 248. Then, robot-status unit 248 may set the status of the robot to "release." Communication interface 202 may send a release-status signal 205b to the robot. In response to receiving release-status signal 205b, the robot may move from stop point 308 and traverse the crossing region 302. In some embodiments, in response to the stop list being empty and the status for the robot being set to release, release-status signal 205b may cause the robot to move to the final target position.

Referring to FIGS. 2 and 4, fleet-control device 104 may perform the following operations for each robot of a plurality of robots and for each crossing region of one or more crossing regions during an emergency-operation mode. During a "code blue" situation, an emergency signal 207 may be sent to fleet-control device 104. In response to emergency signal 207 being received, stop-list unit 246 saves the stop list for the robot. In some embodiments, stop-line unit 242 may identify a stop line 404 (e.g., an emergency stop line) most proximate to the robot from a plurality of emergency stop lines. Communication interface 202 may send a stop-line signal 209 to the robot. Stop-line signal 209 may cause the robot to halt its trajectory to the final target and move to the stop line indicated by stop-line signal 209. Once there, the robot remains on stop line 404 until the normal-operation mode is resumed.

In some embodiments, when a normal signal 211 is received, operational-mode unit 252 may identify a transition from the emergency-operation mode to the normal-operation mode. Stop-list unit 246 may send the stop list for the robot to the communication interface 202, which loads the stop list to the robot via stop-list signal 203. The receipt of the stop list may cause the robot move from stop line 404 and resume its trajectory to the final target via the subsequent stop point (if any) on the stop list.

FIGS. 5A-5D are a flowchart of an exemplary method 500 of multi-robot fleet control by a network device, according to embodiments of the disclosure. Method 500 may be performed by a device, e.g., such as fleet-control device 104 (e.g., a network device), communication interface 202, processor 204, memory 206, storage 208, crossing-region unit 240, stop-line unit 242, path-estimation unit 244, stop-list unit 246, robot-status unit 248, waiting-queue unit 250, operational-mode unit 252, just to name a few. Method 500 may include operations 502-544, as described below. It is to be appreciated that some of the steps may be optional, and some of the steps may be performed simultaneously, or in a different order than shown in FIGS. 5A-5D.

Figure 5A:
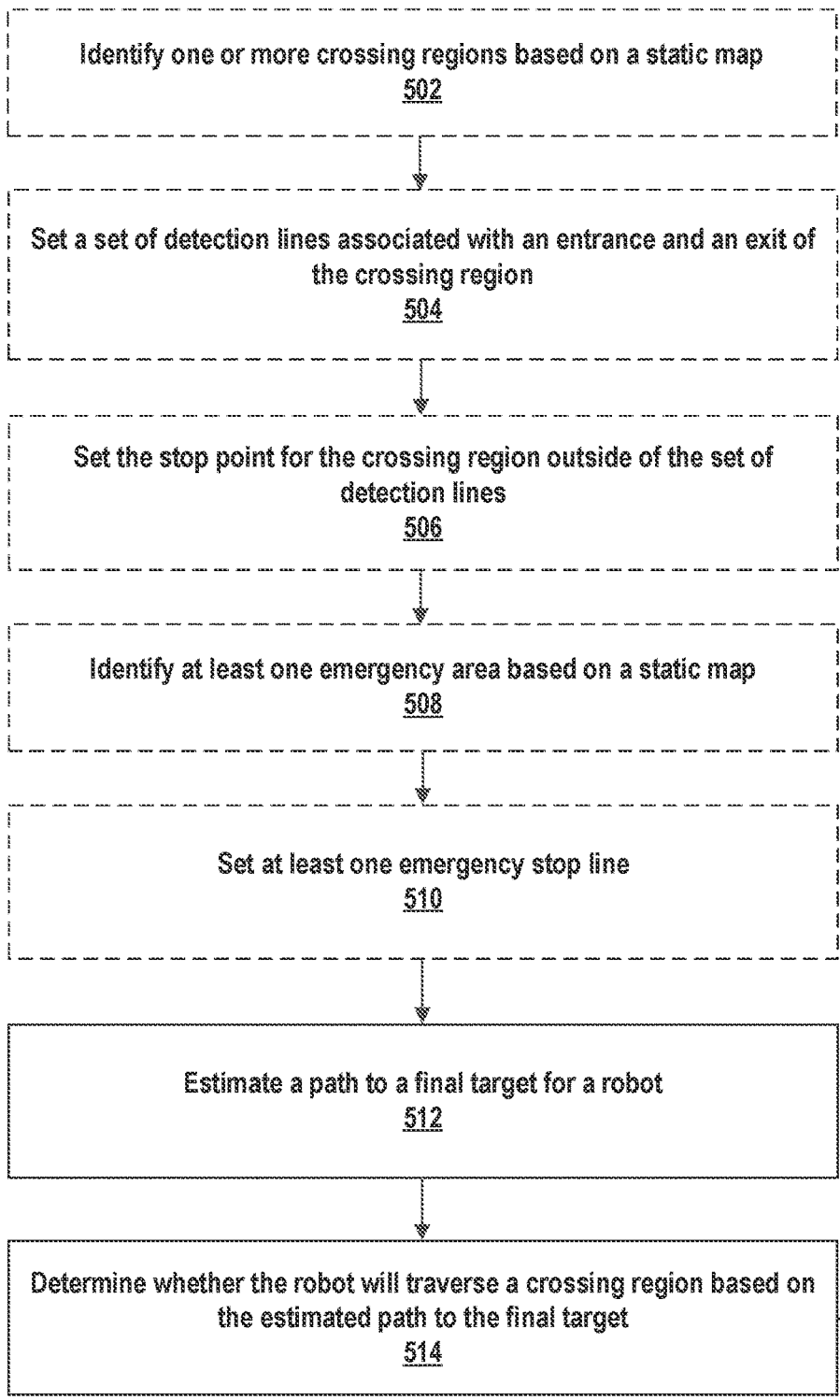
FIGS. 5A-5D are a flowchart of an exemplary method of multi-robot fleet control by a network device, according to embodiments of the disclosure.

Referring to FIG. 5A, at 502, the device may identify one or more crossing regions based on a static map. referring to FIGS. 2, 3A, and 3B, crossing-region unit 240 may identify the one or more crossing regions 302 based on the global static map data. As mentioned above, a crossing region 302 may include an area with various obstacles 304 (e.g., walls, pillars, stairs, etc.) and one or more entry sources/directions. Crossing region 302 is an area in which congestion is likely to occur if multiple robots enter the area concurrently. By way of example and not limitation, crossing region 302 may include a small patient room (see FIG. 3B), a narrow corridor (not shown), hallway intersections (see FIG. 3A), etc.

At 504, the device may set a set of detection lines associated with an entrance and an exit of the crossing region. For example, referring to FIGS. 2, 3A, and 3B, for each crossing region 302, crossing-region unit 240 may set a set of detection lines 306 associated with an entrance and an exit of the crossing region 302. The detection lines are used to detect if a robot will pass a specific crossing region. If a robot's planned path intersects with any detection line 306, then crossing-region unit 240 can identify which crossing region 304 the robot will pass on its way to its target position and from which entrance.

At 506, the device may set the stop point for the crossing region outside of the set of detection lines. For example, referring to FIGS. 2, 3A, and 3B, crossing-region unit 240 may set a stop point 308 for the crossing region outside of each detection line 306. Stop point 308 is used as a location for robots to stop before entering crossing region 302.

At 508, the device may identify at least one emergency area based on a static map. For example, referring to FIGS. 2 and 4, stop-line unit 242 may identify at least one emergency area 402 based on the global static map data. By way of example and not limitation, assuming the facility is a hospital, emergency area 402 may include an ambulance entrance, resuscitation rooms and their pathways, as well as the regions that an emergency "blue code" may occur.

At 510, the device may set at least one emergency stop line. For example, referring to FIGS. 2 and 4, for each emergency area of the at least one emergency area, stop-line unit 424 may set at least one emergency stop line 404. Stop line 404 is set such that it is out of the way of the main pathway and is used for robots to stop in an emergency situation. During an emergency situation, robots move to an remain on the closest stop line 404. In this way, robots do not interfere with emergency equipment or staff during a "code blue" situation.

At 512, the device may estimate a path to a final target for a robot. For example, referring to FIGS. 2, 3A, and 3B, path-estimation unit 244 may estimate a path to a final target (e.g., target position) for a robot based on a path-estimation function. The path-estimation function may be the same path-planning function that is part of a robot's navigation system, or alternatively a simpler path-searching function. The purpose of the path-estimation function is to identify which crossing regions a robot will traverse on its way to the final target. To that end, path-estimation unit 244 may estimate the path that each robot will plan towards its final target. Path-estimation unit 244 may not estimate the path exactly the same as the actual planned path of each robot, as long as it can correctly estimate if a robot will pass any crossing regions. For instance, path-estimation unit 244 may estimate the robot's path based solely on the global static map data, while the robot's path-planning function may identify the path based on the global static map data and the local dynamic map data.

At 514, the device may determine whether the robot will traverse a crossing region based on the estimated path to the final target. For example, referring to FIGS. 2, 3A, and 3B, path-estimation unit 244 may determine whether the robot will traverse crossing region 302 based on the path to the final target.

Figure 5B:
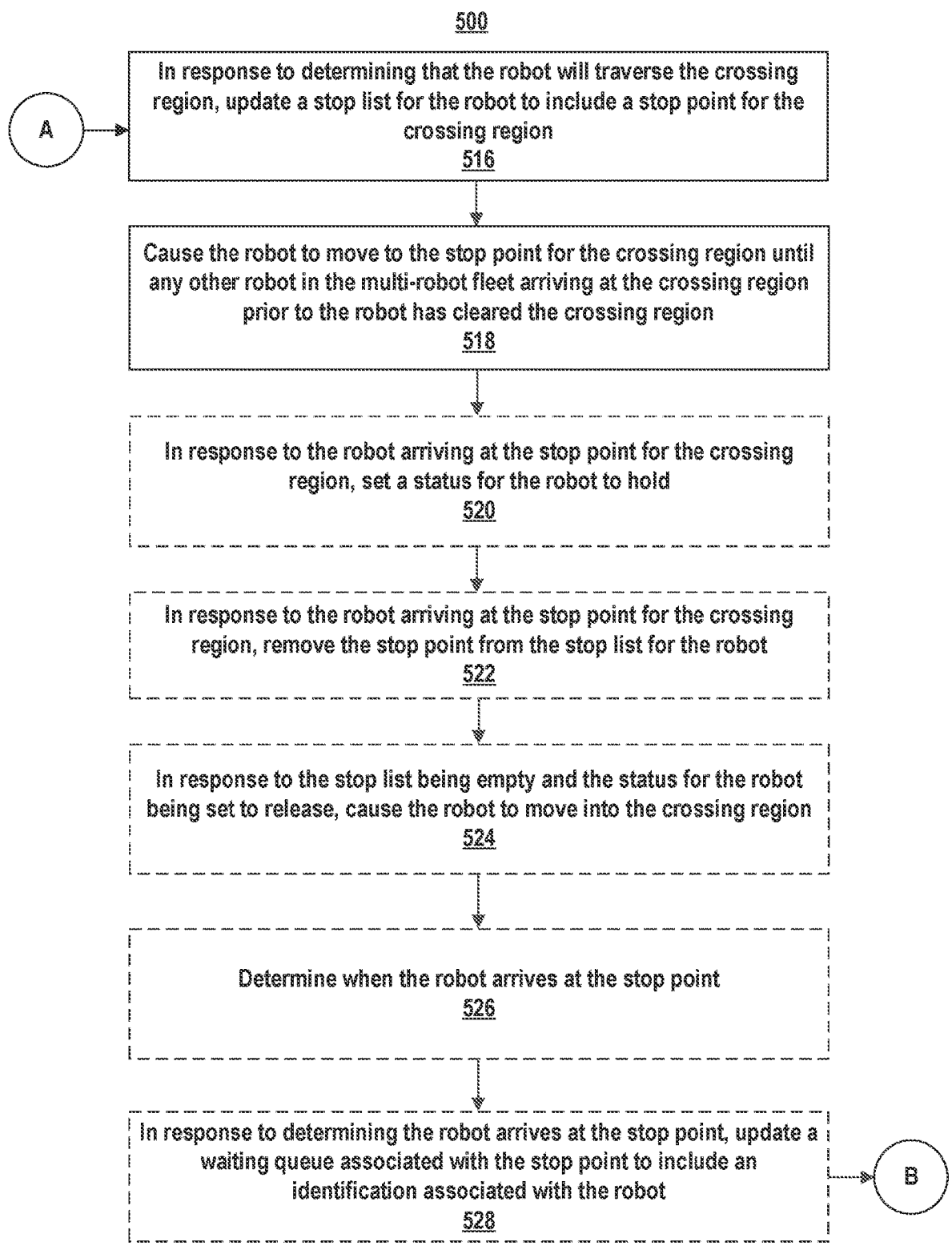

Referring to FIG. 5B, at 516, the device may, in response to determining that the robot will traverse the crossing region, update a stop list for the robot to include a stop point for the crossing region. For example, referring to FIGS. 2, 3A, and 3B, in response to the path-estimation unit 244 determining that the robot will traverse crossing region 302, stop-list unit 246 may update a stop list for the robot to include stop point 308 for crossing region 302. For instance, stop-list unit 246 may maintain a look-up table of stop points and corresponding crossing regions for each robot in the fleet. Stop-list unit 246 may receive a signal indicating a newly identified crossing region traversal for a robot from path-estimation unit 244. Upon receipt of the signal, stop-list unit 246 may update the stop list.

At 518, the device may cause the robot to move to the stop point for the crossing region until any other robot in the multi-robot fleet arriving at the crossing region prior to the robot has cleared the crossing region. For example, referring to FIGS. 2, 3A, and 3B, communication interface 202 may transmit a stop-list signal 203, which indicates the stop points along the robot's path to the final target. Stop-list signal 203 cause the robot to move to stop point 308 for the crossing region 302. Operation 518 may include sub-operations 520-534.

At 520, the device may, in response to the robot arriving at the stop point for the crossing region, set a status for the robot to hold. For example, referring to FIGS. 2, 3A, and 3B, robot-status unit 248 may determine when the robot arrives at stop point 308 based on map data 201 (e.g., local dynamic map data). In response to the robot arriving at stop point 308 for crossing region 302, robot-status unit 248 may set a status for the robot to "hold." Communication interface 202 may send a hold-status signal 205a that indicates the robot's hold status. In response to the hold-status signal 205a, the robot waits at stop point 308 until a release-status signal 205b is received.

At 522, the device may, in response to the robot arriving at the stop point for the crossing region, remove the stop point from the stop list for the robot. For example, referring to FIGS. 2, 3A, and 3B, once the hold status is set by robot-status unit 248 (indicating the robot has arrived at stop point 308), stop-list unit 246 may remove stop point 308 from the stop list for the robot.

At 524, the device may, in response to the stop list being empty and the status for the robot being set to release, cause the robot to move to the final target into the crossing region. For example, referring to FIGS. 2, 3A, and 3B, in response to the stop list being empty and the status for the robot being set to release, release-status signal 205b may cause the robot to move to the final target position.

At 526, the device may determine when the robot arrives at the stop point. For example, referring to FIGS. 2, 3A, and 3B, robot-status unit 248 may determine when the robot arrives at stop point 308 based on map data 201 (e.g., local dynamic map data).

At 528, the device may, in response to determining the robot arrives at the stop point, update a waiting queue associated with the stop point to include an identification associated with the robot. For example, referring to FIGS. 2, 3A, and 3B, in response to determining the robot arrives at the stop point, robot-status unit 248 may send a signal to waiting-queue unit 250. Waiting-queue unit 250 may update a waiting queue associated with stop point 308 to include an identification of the robot. The waiting queue may have a first-in-first-out data structure.

Figure 5C:
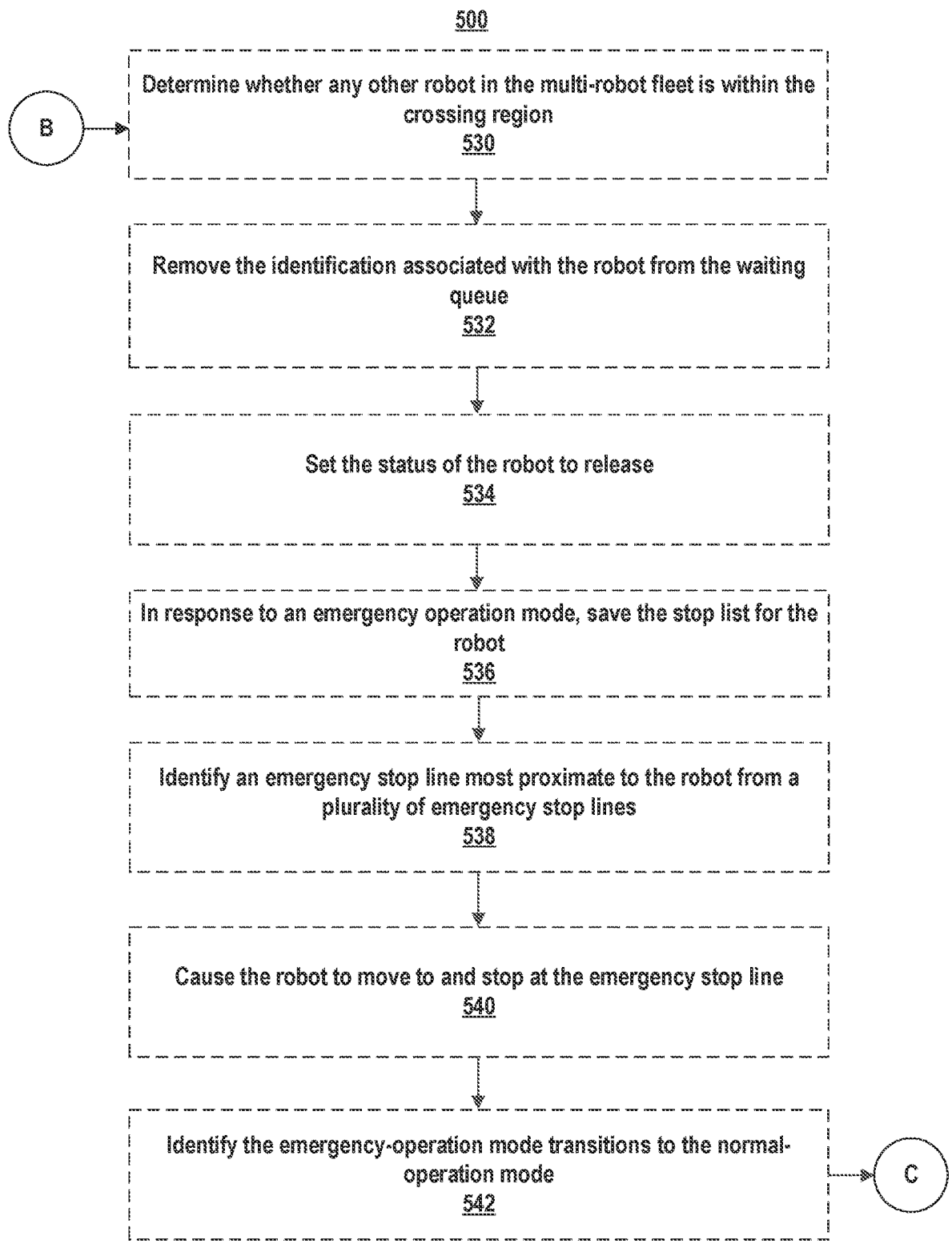

Referring to FIG. 5C, at 530, the device may determine whether any other robot in the multi-robot fleet is within the crossing region. For example, referring to FIGS. 2, 3A, and 3B, waiting-queue unit 250 may determine whether another robot is located within the crossing region based on map data 201 (e.g., local dynamic map data).

At 532, the device may remove the identification associated with the robot from the waiting queue. For example, referring to FIGS. 2, 3A, and 3B, in response to determining that the crossing region is clear (e.g., another robot is not within the crossing region), waiting-queue unit 250 may remove the identification associated with the robot from the waiting queue.

At 534, the device may set the status of the robot to release. For example, referring to FIGS. 2, 3A, and 3B, when the identification is removed from the waiting queue, waiting-queue unit 250 may send a signal to robot-status unit 248. Then, robot-status unit 248 may set the status of the robot to "release."

At 536, the device may, in response to an emergency operation mode of the multi-robot fleet, save the stop list for the robot. For example, referring to FIGS. 2 and 4, in response to emergency signal 207 being received, stop-list unit 246 saves the stop list for the robot.

At 538, the device may identify an emergency stop line most proximate to the robot from a plurality of emergency stop lines. For example, referring to FIGS. 2 and 4, stop-line unit 242 may identify a stop line 404 (e.g., an emergency stop line) most proximate to the robot from a plurality of emergency stop lines.

At 540, the device may cause the robot to move to and stop at the emergency stop line. For example, referring to FIGS. 2 and 4, communication interface 202 may send a stop-line signal 209 to the robot. Stop-line signal 209 may cause the robot to halt its trajectory to the final target and move to the stop line 404 (e.g., an emergency stop line) indicated by stop-line signal 209. Once there, the robot remains on stop line 404 until the normal-operation mode is resumed.

At 542, the device may identify the emergency-operation mode transitions to the normal-operation mode. For example, referring to FIG. 2, when a normal signal 211 is received, operational-mode unit 252 may identify a transition from the emergency-operation mode to the normal-operation mode.

Figure 5D:
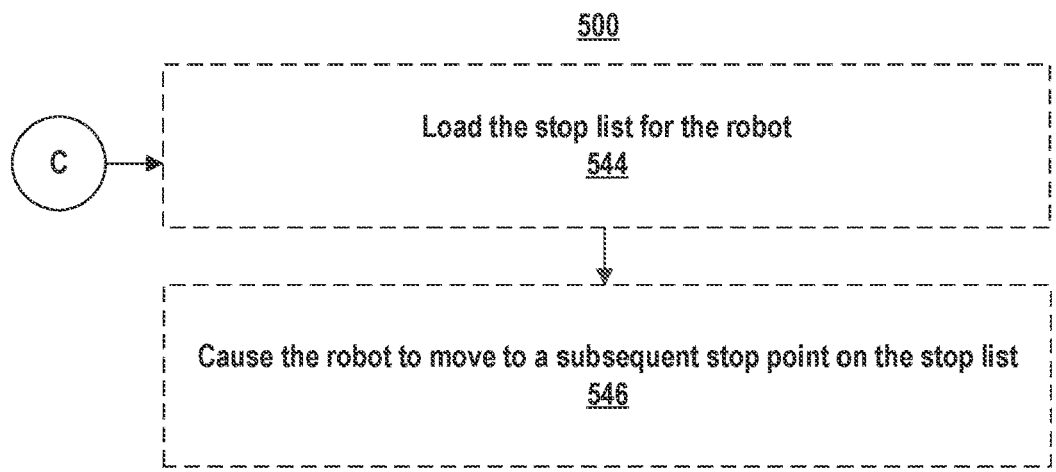

Referring to FIG. 5D, at 544, the device may load the stop list for the robot. For example, referring to FIG. 2, stop-list unit 246 may send the stop list for the robot to the communication interface 202, which loads the stop list to the robot via stop-list signal 203.

At 546, the device may cause the robot to move to a subsequent stop point on the stop list. For example, referring to FIG. 2, the receipt of the stop list may cause the robot move from stop line 404 and resume its trajectory to the final target via the subsequent stop point (if any) on the stop list.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A method for controlling a multi-robot fleet comprising a plurality of robots performed by a network device in a healthcare environment, comprising:
    for each robot of the plurality of robots during a normal-operation mode of the multi-robot fleet,
        estimating, by a processor, a path to a final target for a robot;
        determining, by the processor, whether the robot will traverse a crossing region based on the estimated path to the final target;
        in response to determining that the robot will traverse the crossing region, updating, by the processor, a stop list corresponding to the normal-operation mode for the robot to include a stop point for the crossing region; and
        causing, by the processor, the robot to move to and stop at the stop point for the crossing region until any other robot in the multi-robot fleet arriving at the crossing region prior to the robot has cleared the crossing region; and
    for each robot of the plurality of robots during an emergency-operation mode of the multi-robot fleet,
        saving, by the processor, the stop list corresponding to the normal-operation mode and suspending use of the stop list for the robot during the emergency-operation mode;
        identifying, by the processor, an emergency stop line most proximate to the robot from a plurality of emergency stop lines; and
        causing, by the processor, the robot to move to and stop at the emergency stop line.

2. The method of claim 1, wherein causing the robot to stop at the stop point for the crossing region until any other robot in the multi-robot fleet arriving at the crossing region prior to the robot has cleared the crossing region further comprises:
  in response to the robot arriving at the stop point for the crossing region, setting, by the processor, a status for the robot to hold;
  removing, by the processor, the stop point from the stop list for the robot; and
  in response to the status for the robot being set to release, causing, by the processor, the robot to move into the crossing region.

3. The method of claim 1, wherein causing the robot to stop at the stop point for the crossing region until any other robot in the multi-robot fleet arriving at the crossing region prior to the robot has cleared the crossing region further comprises:
  determining, by the processor, when the robot arrives at the stop point;
  in response to determining the robot arrives at the stop point, updating, by the processor, a waiting queue associated with the crossing region to include an identification associated with the robot, the waiting queue having a first-in-first-out data structure;
  determining, by the processor, whether any other robot in the multi-robot fleet is within the crossing region; and
  in response to determining that no other robot is within the crossing region,
    removing, by the processor, the identification associated with the robot from the waiting queue; and
    setting, by the processor, a status of the robot to release.

4. The method of claim 1, further comprising:
  identifying, by the processor, the emergency-operation mode transitions to the normal-operation mode;
  for each robot of the plurality of robots during the normal-operation mode that follows the emergency-operation mode,
    loading, by the processor, the stop list corresponding to the normal-operation mode for the robot; and
    causing, by the processor, the robot to move to a subsequent stop point on the stop list.

5. The method of claim 1, further comprising:
  identifying, by the processor, one or more crossing regions based on a static map;
  for each crossing region of the one or more crossing regions,
    setting, by the processor, a set of detection lines associated with an entrance and an exit of the crossing region; and
    setting, by the processor, the stop point for the crossing region outside of the set of detection lines.

6. The method of claim 1, further comprising:
  identifying, by the processor, at least one emergency area based on a static map; and
  for each emergency area of the at least one emergency area, setting, by the processor, at least one emergency stop line.

7. An apparatus for controlling a multi-robot fleet comprising a plurality of robots, comprising:
  a processor; and
  memory storing instructions, which when executed by the processor, cause the processor to:
    for each robot of the plurality of robots during a normal-operation mode of the multi-robot fleet,
      estimate a path to a final target for a robot;
      determine whether the robot will traverse a crossing region based on the estimated path to the final target;
      in response to determining that the robot will traverse the crossing region, update a stop list corresponding to the normal-operation mode for the robot to include a stop point for the crossing region; and
      cause the robot to move to and stop at the stop point for the crossing region until any other robot in the multi-robot fleet arriving at the crossing region prior to the robot has cleared the crossing region; and
    for each robot of the plurality of robots during an emergency-operation mode of the multi-robot fleet,
      save the stop list corresponding to the normal-operation mode and suspend use of the stop list for the robot during the emergency-operation mode;
      identify an emergency stop line most proximate to the robot from a plurality of emergency stop lines; and
      cause the robot to move to and stop at the emergency stop line.

8. The apparatus of claim 7, wherein, to cause the robot to stop at the stop point for the crossing region until any other robot in the multi-robot fleet arriving at the crossing region prior to the robot has cleared the crossing region, the memory storing instructions, which when executed by the processor, cause the processor to:
  in response to the robot arriving at the stop point for the crossing region, set a status for the robot to hold;
  remove the stop point from the stop list for the robot; and
  in response to the status for the robot being set to release, cause the robot to move into the crossing region.

9. The apparatus of claim 7, wherein, to cause the robot to stop at the stop point for the crossing region until any other robot in the multi-robot fleet arriving at the crossing region prior to the robot has cleared the crossing region further, the memory storing instructions, which when executed by the processor, cause the processor to:
  determine when the robot arrives at the stop point;
  in response to determining the robot arrives at the stop point, update a waiting queue associated with the crossing region to include an identification associated with the robot, the waiting queue having a first-in-first-out data structure;
  determine whether any other robot in the multi-robot fleet is within the crossing region; and
  in response to determining that no other robot is within the crossing region,
    remove the identification associated with the robot from the waiting queue; and
    set a status of the robot to release.

10. The apparatus of claim 7, wherein the memory storing instructions, which when executed by the processor, further cause the processor to:
  identify the emergency-operation mode transitions to the normal-operation mode; and
  for each robot of the plurality of robots during the normal-operation mode following the emergency-operation mode,
    load the stop list corresponding to the normal-operation mode for the robot; and
    cause the robot to move to a subsequent stop point on the stop list.

11. The apparatus of claim 7, wherein the memory storing instructions, which when executed by the processor, further cause the processor to:
  identify one or more crossing regions based on a static map;
  for each crossing region of the one or more crossing regions
    set a set of detection lines associated with an entrance and an exit of the crossing region; and
    set the stop point for the crossing region outside of the set of detection lines.

12. The apparatus of claim 7, wherein the memory storing instructions, which when executed by the processor, further cause the processor to:
  identify at least one emergency area based on a static map; and
  for each emergency area of the at least one emergency area, set at least one emergency stop line.

13. A non-transitory computer-readable medium storing instructions for controlling a multi-robot fleet comprising a plurality of robots, the instructions, which when executed by at least on processor, cause the at least one processor to:
  for each robot of the plurality of robots during a normal-operation mode of the multi-robot fleet,
    estimate a path to a final target for a robot;
    determine whether the robot will traverse a crossing region based on the estimated path to the final target;
    in response to determining that the robot will traverse the crossing region, update a stop list corresponding to the normal-operation mode for the robot to include a stop point for the crossing region; and
    cause the robot to move to and stop at the stop point for the crossing region until any other robot in the multi-robot fleet arriving at the crossing region prior to the robot has cleared the crossing region; and
  for each robot of the plurality of robots during an emergency-operation mode of the multi-robot fleet,
    save the stop list corresponding to the normal-operation mode and suspend use of the stop list for the robot during the emergency-operation mode;
    identify an emergency stop line most proximate to the robot from a plurality of emergency stop lines; and
    cause the robot to move to and stop at the emergency stop line.

14. The non-transitory computer-readable medium of claim 13, wherein, to cause the robot to stop at the stop point for the crossing region until any other robot in the multi-robot fleet arriving at the crossing region prior to the robot has cleared the crossing region, the instructions, which when executed by the processor, cause the processor to:
  in response to the robot arriving at the stop point for the crossing region, set a status for the robot to hold;
  remove the stop point from the stop list for the robot; and
  in response to the status for the robot being set to release, cause the robot to move into the crossing region.

15. The non-transitory computer-readable medium of claim 13, wherein, to cause the robot to stop at the stop point for the crossing region until any other robot in the multi-robot fleet arriving at the crossing region prior to the robot has cleared the crossing region further, the instructions, which when executed by the processor, cause the processor to:
  determine when the robot arrives at the stop point;
  in response to determining the robot arrives at the stop point, update a waiting queue associated with the crossing region to include an identification associated with the robot, the waiting queue having a first-in-first-out data structure;
  determine whether any other robot in the multi-robot fleet is within the crossing region;
  in response to determining that no other robot is within the crossing region,
    remove the identification associated with the robot from the waiting queue; and
    set a status of the robot to release.

16. The non-transitory computer-readable medium of claim 13, wherein the instructions, which when executed by the processor, further cause the processor to:
  identify the emergency-operation mode transitions to the normal-operation mode; and
  for each robot of the plurality of robots during the normal-operation mode that follows the emergency-operation mode,
    load the stop list corresponding to the normal-operation mode for the robot; and
    cause the robot to move to a subsequent stop point on the stop list.

17. The non-transitory computer-readable medium of claim 13, wherein the instructions, which when executed by the processor, further cause the processor to:
  identify one or more crossing regions based on a static map;
  for each crossing region of the one or more crossing regions,
    set a set of detection lines associated with an entrance and an exit of the crossing region; and
    set the stop point for the crossing region outside of the set of detection lines.

18. The method of claim 1, wherein the emergency-operation mode is associated with a blue-code situation within the healthcare environment.

19. The apparatus of claim 7, wherein the emergency-operation mode is associated with a blue-code situation within a healthcare environment.

20. The non-transitory computer-readable medium of claim 13, wherein the emergency-operation mode is associated with a code-blue situation within a healthcare environment.

* * * * *